(12) United States Patent
Urakawa et al.

(10) Patent No.: US 9,832,851 B2
(45) Date of Patent: Nov. 28, 2017

(54) OPTICAL RESONATOR

(71) Applicant: INTER-UNIVERSITY RESEARCH INSTITUTE CORPORATION HIGH ENERGY ACCELERATOR RESEARCH ORGANIZATION, Tsukuba-shi, Ibaraki (JP)

(72) Inventors: Junji Urakawa, Tsukuba (JP); Yosuke Honda, Tsukuba (JP)

(73) Assignee: INTER-UNIVERSITY RESEARCH CORPORATION HIGH ENERGY ACCELERATOR RESEARCH ORGANIZATION, Ibaraki (JP)

(*) Notice: Subject to any disclaimer, the term of this patent is extended or adjusted under 35 U.S.C. 154(b) by 0 days.

(21) Appl. No.: 15/102,781

(22) PCT Filed: Dec. 4, 2014

(86) PCT No.: PCT/JP2014/082772
§ 371 (c)(1),
(2) Date: Jun. 8, 2016

(87) PCT Pub. No.: WO2015/087944
PCT Pub. Date: Jun. 18, 2015

(65) Prior Publication Data
US 2016/0316549 A1  Oct. 27, 2016

Related U.S. Application Data

(60) Provisional application No. 61/914,737, filed on Dec. 11, 2013, provisional application No. 61/987,126, filed on May 1, 2014.

(51) Int. Cl.
*H05G 2/00* (2006.01)
*H01S 4/00* (2006.01)

(52) U.S. Cl.
CPC . *H05G 2/00* (2013.01); *H01S 4/00* (2013.01)

(58) Field of Classification Search
CPC .. H05G 2/00; H01S 4/00; H01S 1/005; H01S 3/0959; H01S 5/04
See application file for complete search history.

(56) References Cited

U.S. PATENT DOCUMENTS

| 4,598,415 A | 7/1986 | Luccio et al. |
|---|---|---|
| 2006/0222147 A1 | 10/2006 | Filkins et al. |

(Continued)

FOREIGN PATENT DOCUMENTS

| JP | H07-110400 A | 4/1995 |
|---|---|---|
| JP | H09-35898 A | 2/1997 |

(Continued)

OTHER PUBLICATIONS

Akagi, T. et al., "Gamma-Rays Generation with 3D 4-Mirror Cavity for ILC Polarized Positron Source", *Proceedings of IPAC2012*, New Orleans, Louisiana, WEPPD055, 2012, pp. 2645-2647.

(Continued)

*Primary Examiner* — Armando Rodriguez
(74) *Attorney, Agent, or Firm* — Brinks Gilson & Lione

(57) ABSTRACT

The optical resonator as intends to generate coherent X-ray by irradiation of polarized laser interference fringes with electron beam has been unknown.

The present invention provides an optical resonator that is capable of preparing polarization laser, polarization X-ray and coherent X-ray. The optical resonator is characterized by comprising an optical resonator that is capable of circulating two or more polarization lasers and irradiation of the polarization lasers with electron beam introduced by an electron beam feed port which is inserted in the intersection of laser paths inside the optical resonator.

16 Claims, 14 Drawing Sheets

(56) References Cited

U.S. PATENT DOCUMENTS

2006/0251217 A1   11/2006  Kaertner et al.
2013/0215925 A1*  8/2013  Kaster .................. H01S 3/0057
                                                                372/98

FOREIGN PATENT DOCUMENTS

| JP | 9-293915 | * 11/1997 |
|----|----------|-----------|
| JP | H09/293915 A | 11/1997 |
| JP | H11-211899 A | 8/1999 |
| JP | 2008-277204 A | 11/2008 |
| WO | WO 2011/016378 A1 | 2/2011 |
| WO | WO 2012/031607 A1 | 3/2012 |

OTHER PUBLICATIONS

Carstens, H. et al., "Megawatt-Scale Average-Power Ultrashort Pulses in an Enhancement Cavity", *Optics Letters*, vol. 39, No. 9, May 1, 2014, pp. 2595-2598.

Fukuda, M. et al., Development Status and Future Plan of Laser Undulator Compact X-Ray Source (LUCX) in KEK, *J. Particle Acceleratory Society of Japan*, vol. 9, No. 3, Oct. 31, 2012, pp. 156-164. (English Abstract).

Honda, Y. et al., Stabilization of a Non-Planar Optical Cavity Using its Polarization Property, *Optics Communications*, vol. 282, 2009, pp. 3108-3112.

* cited by examiner

FIG.4
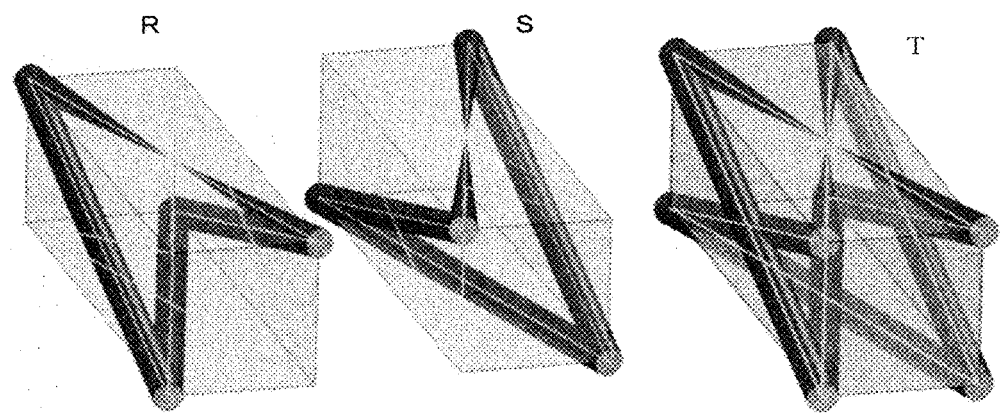
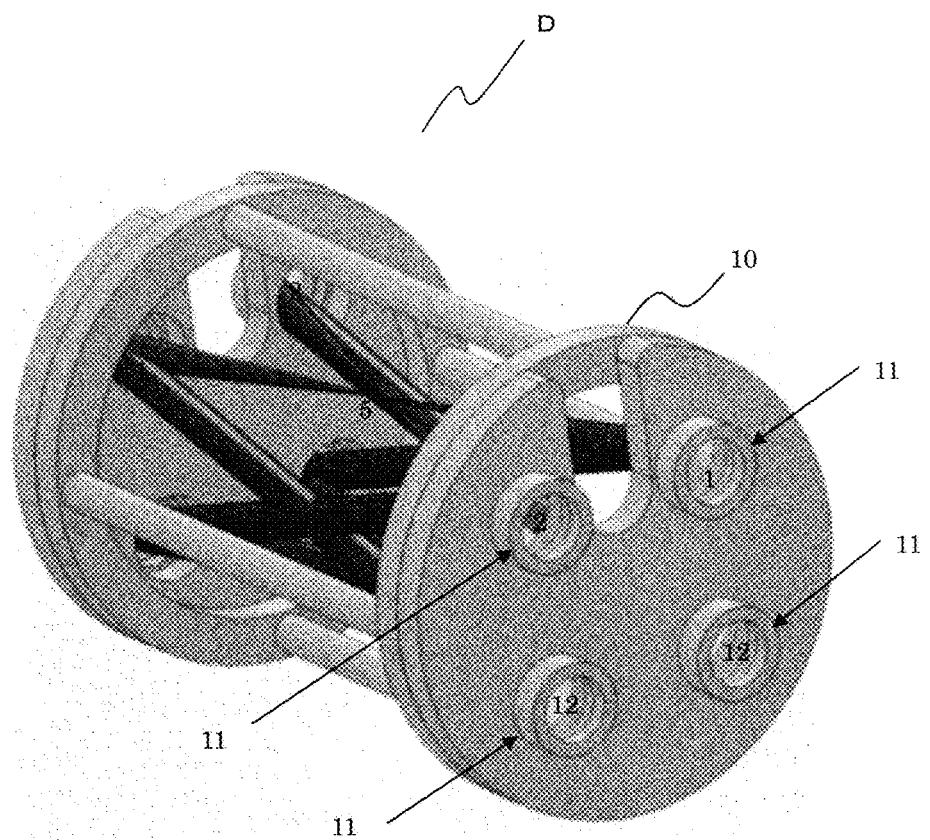

FIG.6
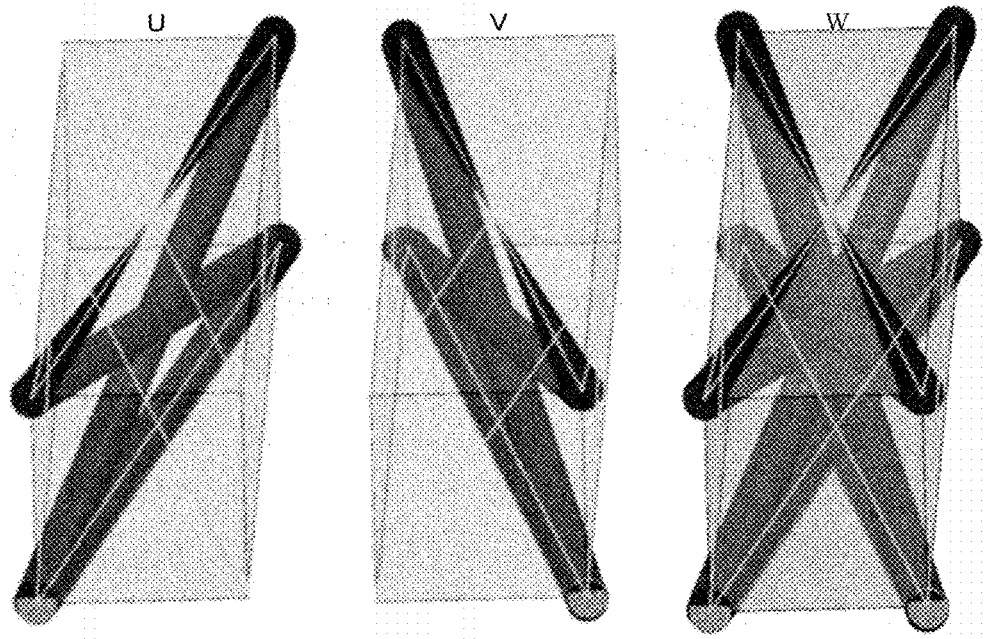
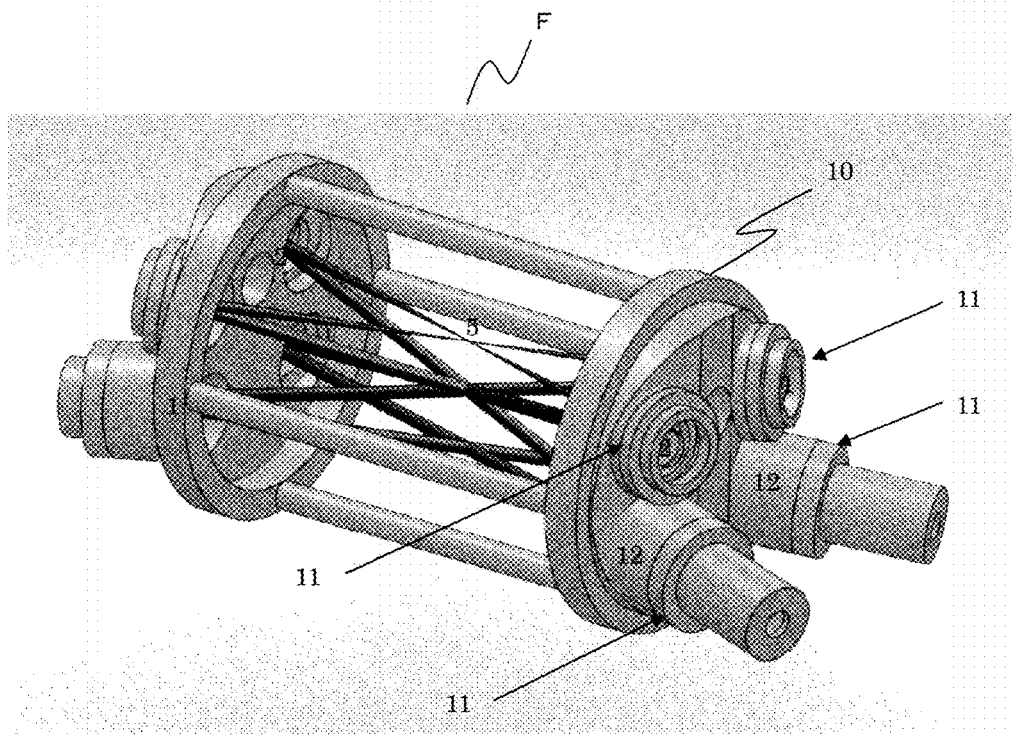

OPTICAL RESONATOR

CROSS-REFERENCE TO RELATED APPLICATIONS

This application is a 371 application of PCT/JP2014/082772 having an international filing date of Dec. 4, 2014, which and claims the benefit of priority to US61/914737, filed on Dec. 11, 2013, and US61/987126, filed on May 1, 2014. The entire contents of these applications are incorporated herein by reference.

TECHNICAL FIELD

The present invention relates to an optical resonator that makes it possible to prepare polarized X-ray and quasi-coherent X-ray.

BACKGROUND ART

There have been known synchrotron radiation and technologies to transform synchrotron radiation into polarized X-ray. The synchrotron radiation is usually known to be high luminance of white radiation in the range from 1 keV to 100 keV. The synchrotron radiation is usually linearly polarized radiation and the radiation can be transformed into horizontally polarized radiation by passing relativistic electron beam in the inside of a deflecting electromagnet or linear undulator which is attached to the synchrotron accelerator. The horizontal polarization is transformed into circular polarization or vertical polarization through a polarizer (phase shifter). For example, the horizontal-linear polarization of 45-degrees in azimuth angle is transformed into the right circular polarization by passing through a λ/4 polarizing plate, the horizontal-linear polarization of—45-degrees in azimuth angle is transformed into the left circular polarization by passing through λ/4 polarizing plate, the horizontal-linear polarization is transformed into the vertical-linear polarization by passing through a λ/2 polarizing plate. This method makes the transformation of linearly-polarized soft X-ray into other polarized soft X-ray possible, but the conversion efficiency is very low. The linearly-polarized hard X-ray is alternately transformed into right circularly polarized X-ray and left circularly polarized X-ray by oscillating periodically a transmission polarizer such as crystallite silicon or diamond. For the electrical oscillation of the transmission polarizer, for example, piezoelectric devices and galvanoscanners are used. It has been known that the maximum speed of polarization-switching being performed by the piezoelectric device and galvanoscanner is about 100 Hz (10 ms) and 2 kHz (0.5 ms), respectively. However, a switching of 2 kHz (0.5 ms) makes polarized X-ray analysis of static samples possible but makes that of biological samples impossible. The method to generate polarized X-ray using the circular accelerators such as synchrotron and cyclotron may be never used for industrial usages due to the huge apparatus of several kilometers in circumferential length.

X-ray free electron laser (SACLA) has been known as coherent X-ray. The SACLA is very big facilities, so unavailable for industrial usages.

On the other hand, the laser inverse Compton scattering X-ray generator using an optical resonator and accelerated electron beam has been known. Since the generator is able to use a compacted accelerator for the accelerated electron beam source, the generator has a great advantage over the Spring-8 and SACLA in industrial prevalence. Therefore, development of the laser inverse Compton scattering X-ray generator using an optical resonator as is capable of generation coherent X-ray is bound to provide immeasurably great effects to the industrial availability.

An optical resonator to amplify coherent laser has been presented (Patent Literature 1).

The Patent Literature 1 discloses a 4-mirror optical resonator that has a detuned concentric configuration as each middle point of the optical path lines in the same straight line (see FIG. 1 in the Patent Literature 1). However, the Patent Literature 1 nowhere describes or suggests an optical resonator to prepare polarized laser.

Regarding to the X-ray generator to generate laser inverse Compton scattering X-ray by using the optical resonator, for example, the following several patent literatures have been presented (Patent Literatures 2-4).

The Patent Literature 2 discloses the apparatus to generate short-wavelength light by collision between laser being repeatedly reflected in the inside of the optical resonator, which providing a unit of multi concave mirrors arranged with a pair of concave mirrors in series, and electron beam being introduced into the optical resonator: wherein, the laser beam is in repetition reflected and focused between the concave mirrors and the collision of the laser beam and electron beam is carried out in the focused region of the laser beam. Because this apparatus in which the mode-locked laser is merely reflected through a pair of concave mirrors is, in structure, the same as the Fox-Smith interferometer-typed optical resonator, the amplification of the laser beam produced by the apparatus is limited to at most 1,000 times in gain due to limitation of the resonator length control. Therefore, the apparatus may generate short-wavelength light for a photolithography usage as described in the literature, but cannot generate strong laser inverse Compton scattering X-ray. Also, the apparatus can generate neither polarized laser nor polarized-X-ray.

The Patent Literature 3 discloses the apparatus to generate X-ray by collision of laser and electron beam in the inside of the Fox-Smith interferometer-typed resonator having a laser oscillator between a pair of mirrors which is put in the electron beam loop-path of the circular accelerators. Because laser is provided only by the laser oscillator, the amplification of the laser supplied by the laser oscillator is limited to at most 1,000 times in gain as explained above, even if reflectance of the reflecting mirrors is much raised. Therefore, it is difficult to generate strong laser inverse Compton scattering X-ray. The apparatus can generate neither polarized laser nor polarized X-ray.

The Patent Literature 4 discloses the apparatus to generate X-ray or γ-ray by collision between laser and electron beam in the inside of the Fox-Smith interferometer-typed optical resonator providing a pair of mirrors with super reflectance that is placed in the electron beam loop-path of the circular accelerators. Also, the invention discloses the apparatus providing a set of the resonators aligning in parallel on the electron beam orbit. However, the optical resonator used in the apparatus is the conventional resonator providing a pair of concave mirrors. Even if the mirrors with 99.99984% in reflectance can be used, the amplification of laser is limited to at most 1,000 times as explained above. Therefore, the apparatus cannot generate strong laser inverse Compton scattering X-ray. The apparatus can neither polarized laser nor polarized X-ray.

Generation of coherent X-ray by using optical resonators has been reported, for example, in the patent literatures (Patent Literatures 5-8, Non-Patent Literature 4).

The Patent Literature 5 has disclosed the method and apparatus to generate coherent X-ray through the laser inverse Compton scattering using the optical resonator. However, the Patent Literature 5 nowhere describes or suggests methods and apparatuses as intend to generate coherent X-ray through irradiation of interference fringes being formed by interference of polarized laser beams with electron beams.

The Patent Literature 6 has disclosed the method and apparatus to generate coherent X-ray through the laser inverse Compton scattering using the optical resonator. However, the Patent Literature 6 nowhere describes or suggests methods and apparatuses as intend to generate coherent X-ray through irradiation of interference fringes being formed by interference of polarized laser with electron beam.

The Patent Literature 7 and Non-Patent Literature 4 describe the method and apparatus which conduct coherent addition of laser light through laser interference in the focal position of laser paths in the four-mirror optical resonator, thereby generation of strong and coherent laser and generation of coherent X-ray by irradiation of the generated strong and coherent laser with electron beam. However, the Patent Literature 7 nowhere describes or suggests methods and apparatuses as intend to generate coherent X-ray through irradiation of interference fringes being formed by interference of polarized laser with electron beam.

The Patent Literature 7 is same as the Patent Literature 1, but the referred sections are different.

The Patent literature 8 has disclosed the X-ray generator embedded in a vacuum chamber, comprising: a pulse compressor to compress laser into femtosecond laser; a collection mirror to collect femtosecond laser; a gas supply unit to supply Ar-gas plasma jet; wherein, Ar-gas plasma jet supplied by the gas supply unit is irradiated with the femtosecond laser generated by the pulse compressor through the collection mirror, coherent characteristic X-ray is generated thereby. The X-ray generated by this method may be coherent characteristic X-ray. However, the Patent Literature 8 is not an invention in regard to the method and apparatus to generate coherent X-ray through the laser inverse Compton scattering using an optical resonator.

In addition to the above Patent Literatures, enormously large numbers of patents and non-patent literatures relating to coherent laser and laser interference fringes have been known. On the other hand, it has been known from the above Patent Literatures 5-7 that coherent X-ray is generated by irradiation of laser inside the optical resonator with electron beam. Therefore, it may be easily conceivable to generate coherent X-ray by irradiation of laser interference fringes or coherent laser with electron beam. However, the optical resonator as intends to generate coherent X-ray by irradiation of polarized laser interference fringes with electron beam has been unknown to the best of the present inventor knowledge. This is due to that the present inventor has found the principle to generate coherent X-ray by irradiation of laser interference fringes being formed with polarized laser interference insides an optical resonator with electron beam, which has ever been unknown, as explained later.

The Patent Literatures 5-7 describe generation of coherent X-ray by irradiation of coherent laser in the optical resonator, but coherence property of the generated X-ray may be incorrect. Because, X-ray being generated by collision of conventional laser beam of several tens microns in size and conventional electron beam of several tens microns in size may be coherent in an extremely short range of initial time and space, however, phases and amplitudes of generated X-ray instantaneously become random in the spatial divergence processes.

In view of the above described circumstances, the present inventors have presented an outstanding three-dimensional-four-mirror (3D-4-mirror) optical resonator, in which a pair of flat mirrors and a pair of concave mirrors are three-dimensionally arranged, that produces high strength of polarized laser to induce laser inverse Compton scattering (Patent Literature 9). The 3D-4-mirror optical resonator equipping a polarization control system is able to prepare selectively a polarization component of polarized laser, either right-circularly polarized laser or left-circularly polarized laser, through the electrically alternate switching of polarization. Therefore, the above 3D-4-mirror optical resonator further equipping an electron beam radiation device is capable of preparing right-circularly polarized X-ray or left circularly polarized X-ray through irradiating circularly polarized laser of different parity with electron beam (Non-Patent Literature 1, Non-Patent Literature 2). Also, the present inventors have presented the two-dimensional four-mirror (2D-4-mirror) optical resonator in which a pair of flat mirrors and a pair of concave mirrors are arranged in the two-dimensional plane (Non-Patent Literature 3). The 2D-4-mirror optical resonator equipping a polarization control system may be able to prepare alternately a polarization component of polarized laser, right-circularly polarized laser or left-circularly polarized laser for circularly polarized laser and horizontal-linearly polarized laser or vertical-linearly polarized laser. Therefore, the above 2D-4-mirror optical resonator further equipping an electron radiation device may be capable of preparing right-circularly polarized X-ray or left-circularly polarized X-ray corresponding to circularly polarized laser and horizontal-linearly polarized X-ray or vertical-linearly polarized X-ray corresponding to linearly polarized laser through irradiating polarized laser of different parity with electron beam. In the present invention, the above parity means right-circular polarization or left-circular polarization for circular polarization and horizontal polarization or vertical polarization for linear polarization.

CITATION LIST

Patent Literature

[Patent Literature 1] WO-A-2012-031607
[Patent Literature 2] JP-A-1995-110400
[Patent Literature 3] U.S. Pat. No. 4,598,415
[Patent Literature 4] JP-A-1999-211899
[Patent Literature 5] US-A-2006-0222147
[Patent Literature 6] US-A-2006-0251217
[Patent Literature 7] WO-A-2012-031607
[Patent Literature 8] JP-A-2008-277204
[Patent Literature 9] WO-A-2011-016378

Non-patent Literature

[Non-Patent Literature 1] Optics Communications 282 (2009) 3108-3112
[Non-Patent Literature 2] T. Akagi et al., "Gamma-rays generation with 3D 4-mirror cavity for ILC polarized positron source", Proceedings of IPAC 2012, New Orleans, La., USA, WEPPD 055, pp. 2645-2647
[Non-Patent Literature 3] H. Shimizu et al., "Stable Planner Type Four-Mirror Cavity Development for X-ray Production as Basic Development of Quantum Beam Technology Program", Proceedings of IPAC 2011, San Sebastian, Spain, pp.1470-1472

[Non-patent Literature 4] H. Carstens, N. Lilienfein, S. Holzberger, C. Jocher, T. Eidam, J. Limpert, A. Tunnermann, J. Weitenberg, D. Yost, A. Alghamdi, Z. Alahmed, A. Azzeer, A. Apolonskiy, E. Fill, F. Krausz, and I. Pupeza, "Megawatt-scale average-power ultrashort pulses in an enhancement cavity", Optics Letters, posted on 27 Mar. 2014, published soon.

DISCLOSURE OF THE INVENTION

Technical Problem

As described above, the present inventors have presented the 3D-4-mirror optical resonator which is able to generate selectively a polarization component of polarized laser, right-circularly polarized laser or left-circularly polarized laser, and to generate selectively polarization component of polarized X-ray through irradiating each laser with electron beam (Patent Literature 9). From this, a single 3D-4-mirror optical resonator makes it possible to switch alternately generation of right-circularly X-ray and left-circularly X-ray. However, it is impossible to generate right-circularly X-ray and left-circularly X-ray more quickly than 10 kHz (0.1 ms), because the polarization switching speed being achieved through the electrical switching of the polarized laser is limited to at most 10 kHz (0.1 ms). For the case of using a two packs of 3D-4-mirror optical resonators that are fixed so as to generate selectively each right-circularly polarized laser and left-circularly polarized laser and put in the electron beam orbital in parallel, the case leads a difficult problem how to focus two polarized X-rays that are radiated from two light-sources being separated by several tens cm distance from each other. The case for the 2D-4-mirror optical resonator is also the same as above.

An object of the present invention is, in view of the above described circumstances, to provide an optical resonator which is capable of preparing alternately polarized strong X-ray with different parity at time-intervals of electron bunches of irradiated electron beam or photons of polarized laser. Another object of the present invention is to make it possible to prepare coherent laser inverse Compton scattering X-ray using the same optical resonator as above.

Solution to Problem

As the results of extensive studies to achieve the above described object, the present inventor has found that the X-ray generating method by laser inverse Compton scattering using an optical resonator is very effective to achieve the above object and has achieved the present invention based on this finding.

That is, the present invention is:

1. An optical resonator, characterized by comprising: an optical system that includes independent two or more laser paths and intersection of the laser paths and windows to introduce, exit and reflect each independent laser in both ends of each independent laser path.

2. The optical resonator according to item 1, comprising: said the optical system that includes resonant mirrors to amplify independent two or more lasers respectively, laser paths to circulate independently two or more lasers between the resonant mirrors, intersections of the laser paths; wherein, circulates independently two or more polarized lasers.

3. The optical resonator according to item 2, including: an electron beam feed port inserted in the intersection of laser paths of said the optical system; wherein, circulates independently two or more polarized lasers, the polarized laser is irradiated with the electron beam, followed by generation of polarized X-ray.

4. The optical resonator according to claim 2: wherein, the polarized laser is a polarization component of polarized laser, the polarization component is irradiated with electron beam, followed by generation of polarized X-ray.

5. The optical resonator according to claim 3: wherein, the polarized laser is a polarization component of polarized laser, the polarization component is irradiated with electron beam, followed by generation of polarized X-ray.

6. The optical resonator according to claim 2: wherein, interference fringes are formed in the intersection of polarized laser paths.

7. The optical resonator according to claim 6, including: an electron feed port inserted in the interference fringes; wherein, the interference fringes are irradiated with the electron beam, followed by generation of X-ray.

8. An optical resonator, characterized by comprising: resonant mirrors; laser path between the resonant mirrors; an electron feed port housing an optical element including an X-ray condenser lens and pinhole which is inserted in the laser path; wherein, laser in the laser path is irradiated with electron beam, thereby X-ray is generated, the generated X-ray is transformed into coherent X-ray through the optical element.

9. An X-ray generating optical resonator, comprising: resonant mirrors being stressed so as to generate laser interference fringes; an electron beam feed port which is inserted in the laser path between the resonant mirrors; wherein, the laser interference fringes are generated in the laser path between the resonant mirrors, the generated laser interference fringes are irradiated with electron beam introduced by the electron feed port, followed by generation of coherent X-ray.

10. The optical resonator according to claim 2: wherein, a 3D-8-mirror optical resonator is used as the optical resonator.

11. The optical resonator according to claim 3: wherein, a 3D-8-mirror optical resonator is used as the optical resonator.

12. The optical resonator according to claim 4: wherein, a 3D-8-mirror optical resonator is used as the optical resonator.

13. The optical resonator according to claim 5: wherein, a 3D-8-mirror optical resonator is used as the optical resonator.

14. The optical resonator according to claim 6: wherein, a 3D-8-mirror optical resonator is used as the optical resonator.

15. The optical resonator according to claim 7: wherein, a 3D-8-mirror optical resonator is used as the optical resonator.

16. The optical resonator according to claim 8: wherein, a 2D-4-mirror optical resonator or 3D-4-mirror optical resonator is used as the optical resonator.

Advantageous Effects of the Invention

The first advantageous effect of the present invention is to present the optical resonator that is capable of circulating two or more polarized lasers and of crossing the polarized lasers. Here, two or more polarized lasers are, for example, each polarization component being separated from polarized laser. Each polarization component being separated from polarized laser are, for example, right-circularly polarized laser or left-circularly polarized laser for circularly polarized laser, horizontal-linearly polarized laser or vertical-linearly polarized laser for linearly polarized laser. The second advantageous effect is to present the optical resonator that is capable of preparing polarized X-ray by irradiation of the polarized laser being prepared using the same optical resonator as above with electron beam. The third advantageous effect is to present the optical resonator that is capable of preparing interference fringes due to laser interference of polarized laser in the inside of the same optical resonator as above. The forth advantageous effect is to present the optical resonator that is capable of preparing coherent X-ray in accordance with stripe spacings of the interference fringes by irradiation of the interference fringes with electron beam. The fifth advantageous effect is to present the optical resonator that is capable of transforming the polarized X-ray which is generated by the optical resonator into coherent X-ray through an optical element including an X-ray condenser lens and pinhole.

The 3D-8-mirror optical resonator, one of the present optical resonators, makes it possible to circulate two or more polarized lasers, for example, two polarization components of polarized laser, right-and left-circularly polarized lasers or horizontal- and vertical-linearly polarized lasers in the optical resonator. Further, the 3D-8-mirror optical resonator in which an electron feed port is inserted is capable of preparing alternately strong polarized X-ray corresponding to the polarization of polarized laser at time-intervals of electron bunches of the radiated electron beam or photons of the polarized laser, usually at time-intervals of less than $10^{-8}$ s. The oscillation speed of polarized X-ray being possible by the present invention is higher by $10^5$ times than a switching speed of 2 kHz for the conventional synchrotron radiation polarized X-ray.

The above 3D-8-mirror optical resonator makes it possible to prepare interference fringes at the intersection of two polarized lasers. Therefore, the 3D-8-mirror optical resonator which equips an electron feed port inserted at the intersection is capable of preparing X-ray in accordance with stripe spacings of the interference fringes. Preparation of the laser interference fringes and coherent X-ray is based on the principle founded by the present inventor.

The present optical resonator is very compact in comparison with the conventional giant laser oscillator. The present resonator is usually able to prepare high luminance of polarized laser pulse with emittance of 0.08 µm-rad or less and with a megawatt class of power. These capabilities of the present invention are equivalent or more excellent than those for the conventional giant laser oscillator. The polarized X-ray being prepared by the present invention is in the range from soft X-ray to γ-ray and has usually emittance of 0.08 µm-rad or less as strong as the SPring-8 and SACLA radiation. As the accelerator to supply electron beam into the electron feed port, a RF-linear accelerator of about 6 m in length can be used. Therefore, the present invention makes it possible to present innovative and highly advanced and compacted X-ray generator that is capable of preparing alternately high luminance of polarized X-ray at surprisingly fast time-intervals, usually at intervals of 10 ns or less and coherent X-ray.

BRIEF DESCRIPTION OF THE DRAWINGS

FIG. 4 is a schematic structural view illustrating the 3D-8-mirror optical resonator.

FIG. 6 is a schematic structural view illustrating another 3D-8-mirror optical resonator.

DETAILED DESCRIPTION OF THE PREFERRED EMBODIMENTS

Other objects, features and advantages of the invention will become apparent from the following description of the embodiments of the invention taken in conjunction with accompanying drawings. Hereinafter, the present invention will be specially explained as an execution embodiment using the following drawings. It should be further understood by those skilled in the art that although the foregoing description has been made on embodiments of the invention, the invention is not limited thereto and various changes and modifications may be made without departing from the spirit of the invention and the scope of the appended claims.

Figure 1:
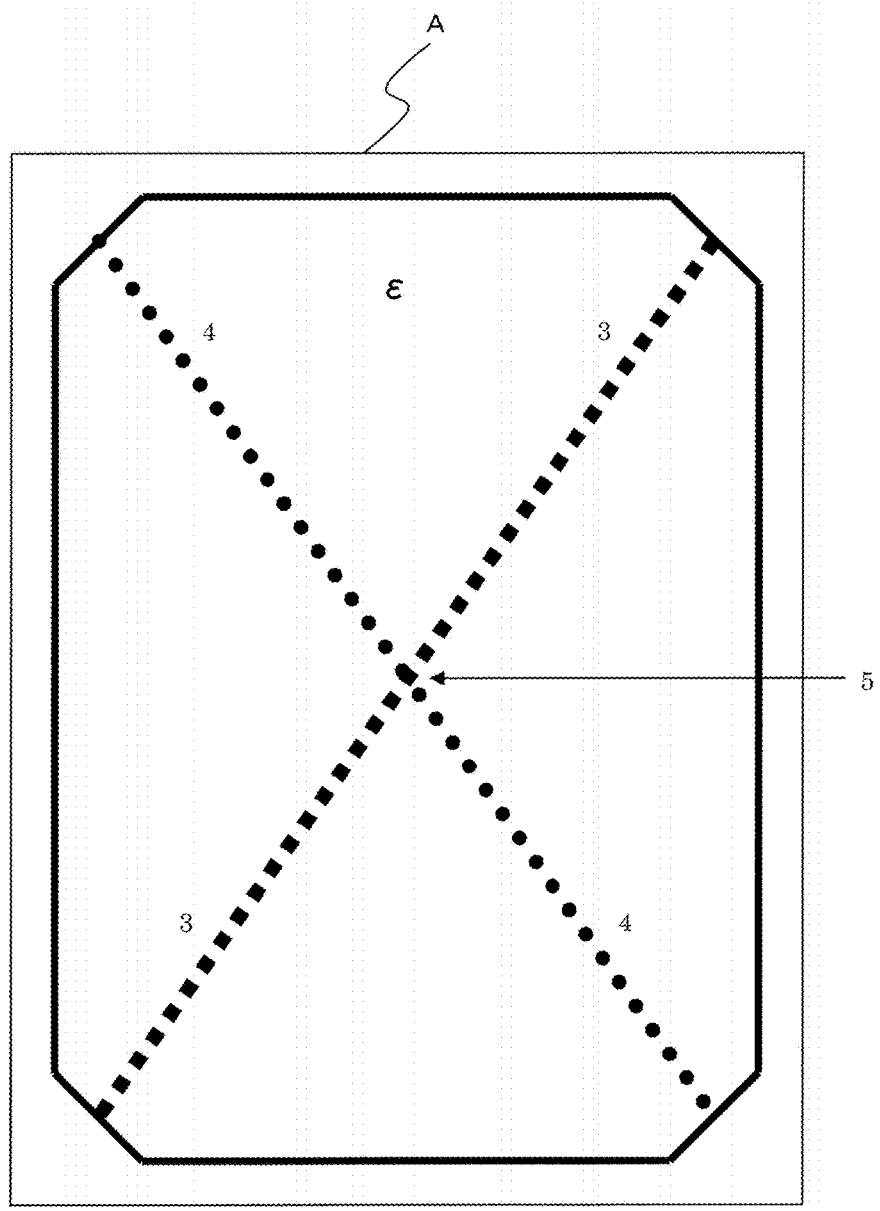
FIG. 1 shows a schematic structural view illustrating the optical resonator comprising the optical system to circulate independently two or more lasers.

FIG. 1 shows the optical resonator (A) according to claim 1, comprising: the optical system that includes independent two or more laser paths (3, 4) and intersection (5) of the laser paths (3, 4) and windows to introduce, exit and reflect each independent laser in both ends of each independent laser path. Herein, the window is for example, the Brewster's window to transfer laser into polarized laser, a window attaching polarizing device to pass selectively polarization laser, and their assemblies. A resonant mirror is usually used as the window. Two or more laser paths denote the paths to circulate independently two or more lasers.

As thereto and thereafter laser, circular polarization laser, linear polarization laser and elliptic polarization laser and polarization element of their polarization lasers can be used. The polarization element denotes right circular or left circular polarization laser for circular polarization laser, horizontal linear or vertical linear polarization laser for linear polarization laser. The above two or more polarization lasers are allowed to be the same or different from each other.

Figure 2:
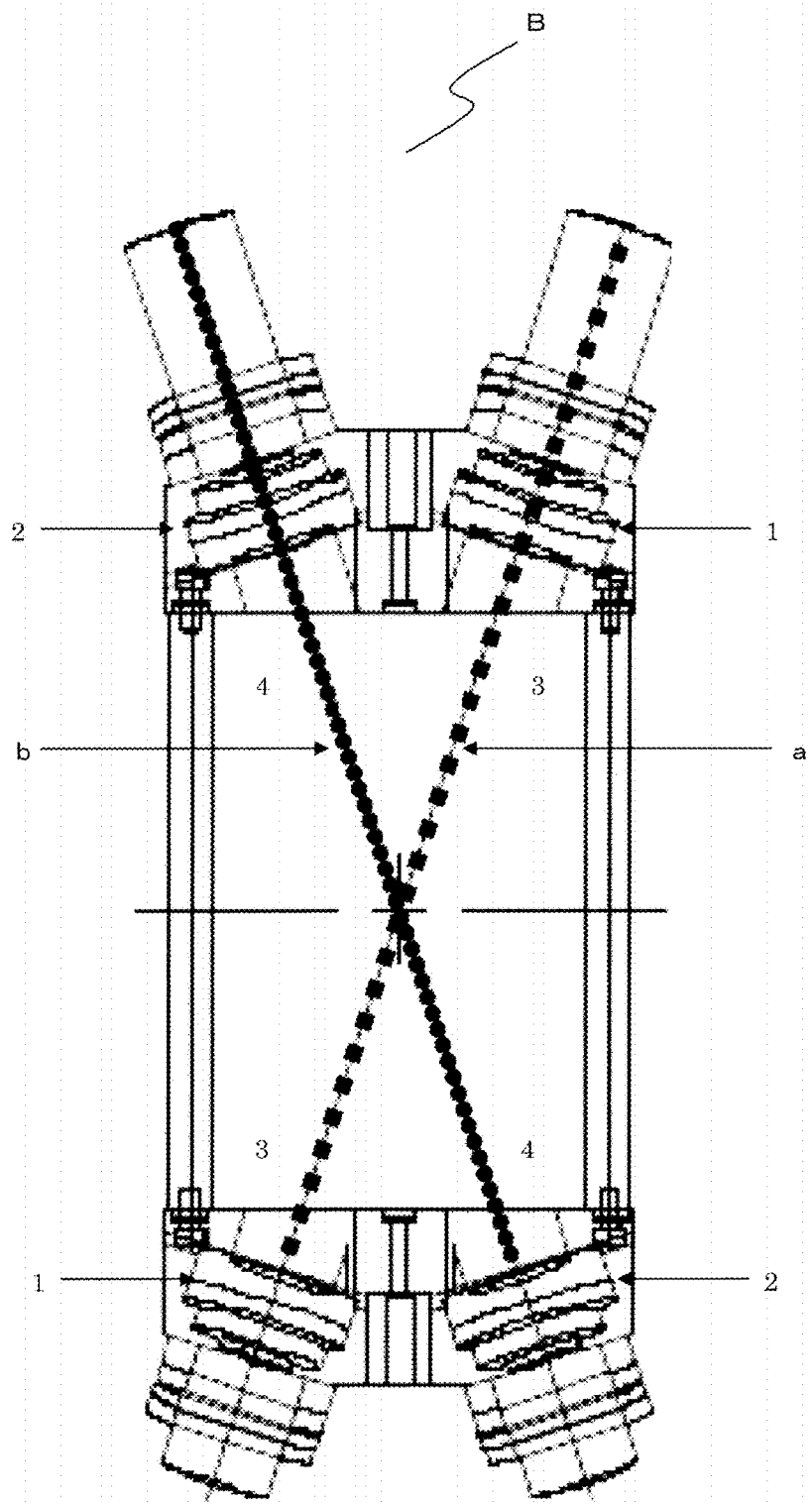
FIG. 2 is a schematic structural view illustrating the optical resonator that circulates two or more polarized lasers and crosses the polarized laser paths.

FIG. 2 shows the optical resonator (B) according to claim 1. The optical resonator (B) is characterized by comprising: resonant mirrors (1, 1, 2, 2) to amplify independent two or more lasers respectively; the laser paths (3, 4) between the resonant mirrors (1, 1, 2, 2) that circulate two or more polarized lasers (a, b) in the laser paths (3, 4) between the resonant mirrors (1, 1, 2, 2); the intersection (5) of the laser paths (3, 4); wherein, two polarization lasers (a, b) pass the intersection (5). Here, the resonant mirror is also called a resonator mirror. The resonant mirror used for the present invention is usually coated with dielectric multi-layers. The resonant mirror is properly selected from a concave mirror, spherical concave mirror, cylindrical concave mirror, flat mirror, and the like.

Figure 3:
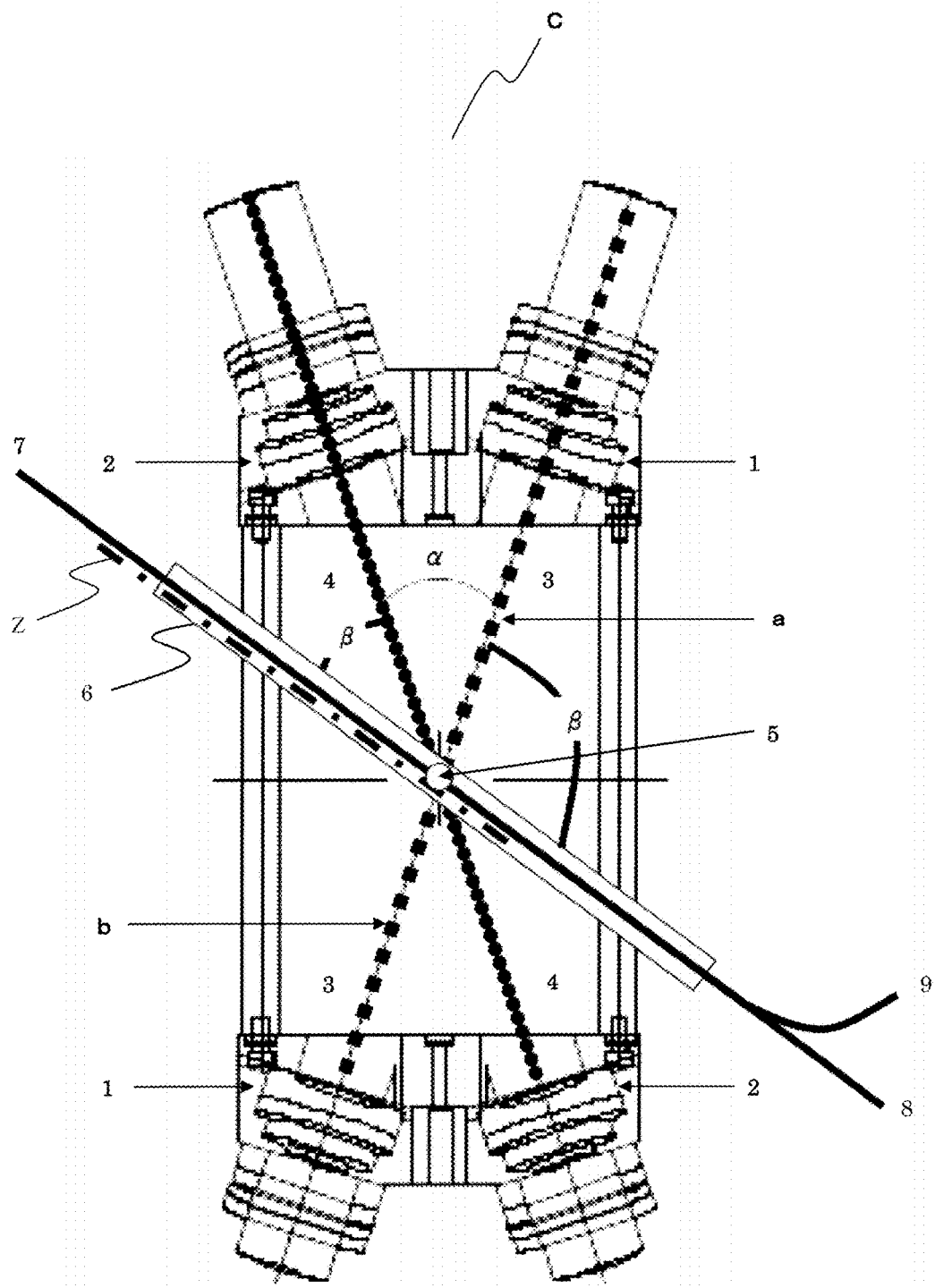
FIG. 3 is a schematic structural view illustrating the optical resonator that is capable of preparing polarized X-ray.

FIG. 3 shows the optical resonator (C) according to claim 2. The optical resonator (C) comprises, in principle, the optical resonator (B) according to claim 1 and electron feed port (6) inserted in the optical resonator (B). The optical resonator (C), comprises: the resonant mirrors (1, 1, 2, 2); the laser paths (3, 4) between the resonant mirrors (1, 1, 2, 2) that circulate two or more polarization lasers (a, b) in the laser paths (3, 4); the intersection (5) crossing the laser paths (3, 4); the electron feed port (6) inserted in the intersection; wherein, two polarization lasers (a, b) passing the intersection (5) are irradiated with electron beam introduced through the electron feed port (6), thereby X-ray (8) is generated. The generated X-ray (8) conserves the same parity as those of the polarization lasers (a, b). Here, the parity of polarization laser denotes the polarization component of polarization laser. The polarization component of polarization laser is, for example, right circular polarization or left polarization for circular polarization laser, horizontal linear polarization or vertical linear polarization for linear polarization laser. An angle (α) between the laser paths (3, 4) is variable in the range from 0-degree to 180-degrees. The angle (α) is usually controlled through a piezoelectric device to control the resonator length. An angle (β) is variable in the range from 0-degree from 180-degrees. Separation of the generated X-ray (8) and remaining electron beam (9) is performed by bending an orbit of the electron beam using a magnet.

FIG. 4 shows the three-dimensional eight-mirror (3D-8-mirror) optical resonator (D) according to claim 2 or 9. The 3D-8-mirror optical resonator (D), comprising: a 3D-8-mirror optic system (T) that is prepared by uniting a 3D-4-mirror optic system (R) and its mirror image optic system (S) and housed in a single flame; wherein, each of eight mirrors of the 3D-8-mirror optic system (T) is arranged on each apex of a polyhedron as each laser path between the resonant mirrors of the 3D-8-mirror optic system (T) crosses with each other, each circular polarization laser with different parity, which is amplified in the 3D-8-mirror optic system (T), can alternately pass an intersection where each laser path between the resonant mirrors of the 3D-8-mirror optic system (T) crosses with each other. The mirror image optic system (S) is the same optic system as the mirror image of the 3D-4-mirror optic system (R). The 3D-8-mirror optic system (T) is twice-symmetric about a center axis of a plain containing two pairs of resonant mirrors. The 3D-4-mirror optic system (R) and mirror optic system (S) can accumulate selectively right circular polarization laser or left circular polarization laser. Therefore, the 3D-8-mirror optic system (T) is able to accumulate right circular polarization laser and left circular polarization laser. Each mirror of the 3D-8-mirror optic system (T) is arranged on each apex of a polyhedron as each laser path between the resonant mirrors of the 3D-8-mirror optic system (T) crosses with each other at the intersection. The intersection is usually a position where each midpoint of the laser path of the resonant mirrors overlaps. The 3D-8-mirror optical resonator (D) is housed in the frame (10) and each mirror is supported by the mirror holders (11) of the frame (10). Two lasers introduced from a mode-lock oscillator are polarized into right circular polarization laser and left circular polarization laser through the 3D-8mirror optic system equipping a polarization control system are amplified between the resonant mirrors and pass alternately the intersection (5). A time that photons of each circular polarization laser pulse pass alternately the intersection (5) is approximately equal to the time that the laser pulse goes half around the laser path. For example, in the case of the 325 MHz frequency repetition the time is about 3.075 ns.

Figure 5:
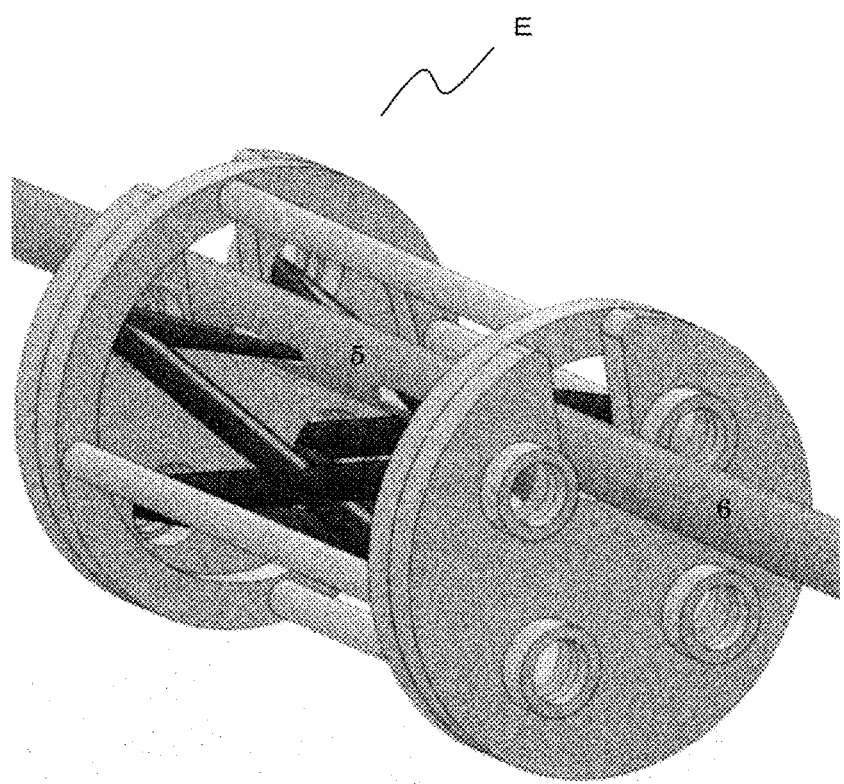
FIG. 5 is a schematic structural view illustrating the 3D-8-mirror optical resonator that is capable of preparing polarized X-ray.

FIG. 5 shows the 3D-8-mirror optical resonator (E) according to claim 3 or 9. The 3D-8-mirror optical resonator (E), comprising: the 3D-8-mirror optical resonator (D); an electron feed port (6) inserted in the intersection (5) of the 3D-8-mirror optical resonator (D). The 3D-8-mirror optical resonator (E) is housed in the frame (10) as the electron feed port (6) is arranged at the intersection (5) where each laser path between the resonant mirrors crosses with each other. Electron bunches of the radiated electron beam pass the intersection (5) at intervals of an operation frequency of electron beam. For example, the radiation of 162.5 MHz electron beam makes electron bunches pass at intervals of 6.15 ns. As each circular polarized laser with different parity pass alternately through the intersection (5), the radiation of electron beam through the electron feed port (6) at the intersection (5) generates alternately circular polarization X-ray having the parity of laser pulse that came into collision with electron beam. For example, the irradiating polarization laser pulse of 325 MHz repetition frequency with electron beam of 162.5 MHz generates alternately each circular polarization X-ray with different parity every 6.15 ns. This is achievable by controlling collision-timing with an accuracy of 1 ps. The control is achievable within the fluctuation of signal/noise by fixing relative position of an integral relation between an accelerator-clock and mode-lock laser oscillator-clock and by using a delay circuit being capable of controlling within several nanoseconds.

FIG. 6 shows another 3D-8-mirror optical resonator (F) according claim 2 or 9. The 3D-8-mirror optical resonator (F), comprising: a 3D-8-mirror optic system (W) that is prepared by uniting a two-dimensional four-mirror (2D-4-mirror) optic system (U) and its mirror image optic system (V) and housed in a single frame; wherein, each of eight mirrors of the 3D-8-mirror optic system (W) is arranged on each apex of a polyhedron as each laser path between the resonant mirrors of the 3D-8-mirror optic system (W) crosses with each other, each circular polarization laser pulse or linear polarization laser with different parity, which is amplified in the 3D-8-mirror optic system (W), can alternately pass an intersection where each laser path between the resonant mirrors of the 3D-8-mirror optic system (W) crosses with each other. The mirror image optic system (V) is the same optic system as the mirror image of the 2D-4-mirror optic system (U). The 3D-8-mirror optic system (W) is twice-symmetric about a center axis of a plain containing two pairs of resonant mirrors. The 2D-4-mirror optic system (U) and mirror optic system (V) can accumulate selectively right circular polarization laser or left circular polarization laser for circular polarization laser or horizontal linear polarization laser or vertical polarization laser for linear polarization laser. Therefore, the 3D-8-mirror optic system (W) is able to accumulate right circular polarization laser and left circular polarization laser or horizontal linear polarization laser and vertical linear polarization laser. Each mirror of the 3D-8-mirror optic system (W) is arranged on each apex of a polyhedron as each laser path between the resonant mirrors of the 3D-8-mirror optic system (W) crosses with each other at the intersection (5). The intersection (5) is usually a position where each midpoint of the laser path of the resonant mirrors overlaps. The 3D-8-mirror optical resonator (F) is housed in the frame (10) and each mirror is supported by the mirror holders (11) of the frame (10). Two lasers introduced from a mode-lock oscillator are polarized into right circular polarization laser and left circular polarization laser or horizontal linear polarization laser and vertical polarization laser through the 3D-8mirror optic system equipping a polarization control system are amplified between the resonant mirrors and pass alternately the intersection (5). A time that photons of each circular polarization laser pulse or linear polarization laser pulse pass alternately the intersection (5) is approximately equal to the time that the laser pulse goes half around the laser path. For example, in the case of the 325 MHz frequency repetition the time is about 3.075 ns.

Figure 7:
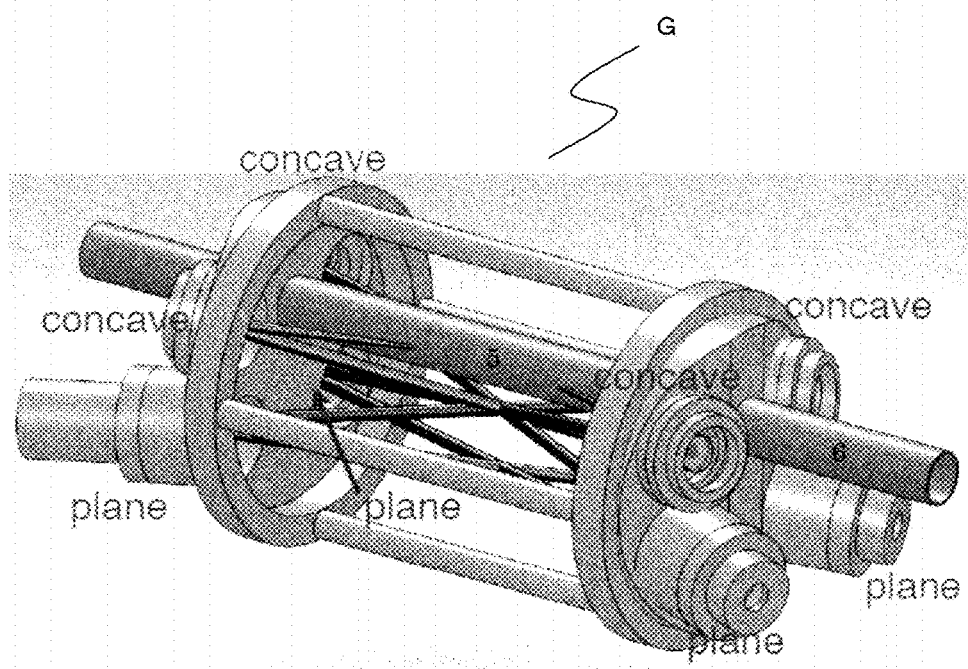
FIG. 7 is a schematic structural view illustrating the 3D-8-mirror optical resonator that is capable of preparing polarized X-ray.

FIG. 7 shows the 3D-8-mirror optical resonator (G) according to claim 3 or 9. The 3D-8-mirror optical resonator (G), comprising: the 3D-8-mirror optical resonator (F); an electron feed port (6) inserted in the intersection (5) of the 3D-8-mirror optical resonator (F). The 3D-8-mirror optical resonator (G) is housed in the frame (10) as the electron feed port (6) is arranged at the intersection (5) where each laser path between the resonant mirrors crosses with each other. Electron bunches of the radiated electron beam pass the intersection (5) at intervals of an operation frequency of electron beam. For example, the radiation of 162.5 MHz electron beam makes electron bunches pass at intervals of 6.15 ns. As each circular polarized laser or linear polarization laser with different parity pass alternately through the intersection (5), the radiation of electron beam through the electron feed port (6) at the intersection (5) generates alternately circular polarization X-ray or linear polarization X-ray having the parity of laser pulse that came into collision with electron beam. For example, the irradiating polarization laser pulse of 325 MHz repetition frequency with electron beam of 162.5 MHz generates alternately each circular polarization X-ray or linear polarization X-ray with different parity every 6.15 ns. This is achievable by controlling collision-timing with an accuracy of 1 ps. The control is achievable within the fluctuation of signal/noise by fixing relative position of an integral relation between an accelerator-clock and mode-lock laser oscillator-clock and by using a delay circuit being capable of controlling within several nanoseconds.

The present inventor has found the principle that generation of coherent X-ray by laser inverse Compton scattering using an optical resonator requires to fill the $1^{st}$ requirement, formation of interference fringes by interference of two or more polarization lasers; and to fill the $2^{nd}$ requirement, preferably to orthogonalize the traveling direction of electron beam and wavefront of the interference fringes. Preferable one of such polarization laser is linear polarization laser.

Stripe spacings (d) of the laser interference fringes are determined by the following Equation 1. Here, λ is wavelength of interfering laser beams, α is a cross angle of overlapped laser beams. Therefore, it is possible to make interference fringes with stripe spacings (d) shorter than the wavelength (λ) in principle.

$$d = \frac{\lambda}{2\sin\frac{\alpha}{2}} \quad \text{Equation 1}$$

The stripe spacings (d) of the laser interference fringes depend on a wavelength of polarization laser. This makes it possible to generate the laser interference fringes with the stripe spacings closed to X-ray wavelength, according to short-wavelength laser. It should be worth noticing that the above design provides essential foundation and signification as make it possible to generate coherent X-ray.

Figure 8:
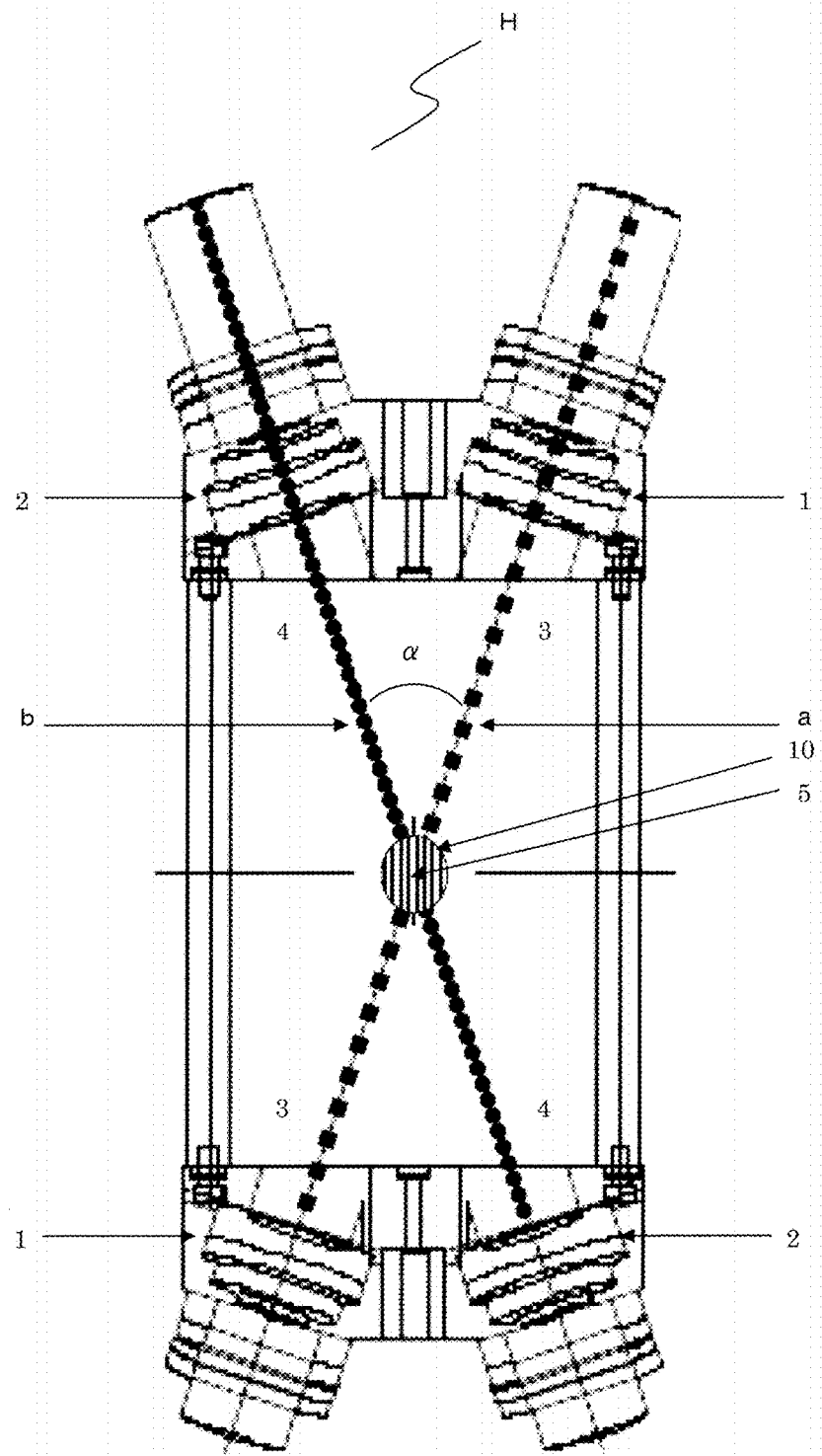
FIG. 8 is a schematic structural view illustrating the optical resonator that is capable of preparing laser interference fringes.

FIG. 8 shows the optical resonator (H) according to claim 6. The optical resonator (H) uses, in principle, the optical resonator (B) according to claim 2. The optical resonator (H), comprising: the resonant mirrors (1, 1, 2, 2); the laser paths (3, 4) to circulate two or more polarization lasers (a, b); the intersection (5) to cross the laser paths (3, 4); wherein laser interference fringes (10) are formed in the intersection (5) by laser interference of two or more polarization lasers circulating in the laser paths (3, 4). Stripe spacings of the interference fringes can be controlled by changing an angle (α) between the resonant mirrors (1, 2), that is, a cross angle of overlapped polarization laser. The angle (α) is variable in the range from 0 degree to 180 degrees, usually 20 degrees or less, preferably 10 degrees or less. Control of the angle (α) is usually performed using a piezoelectric device used for controlling optical resonator length.

Figure 9:
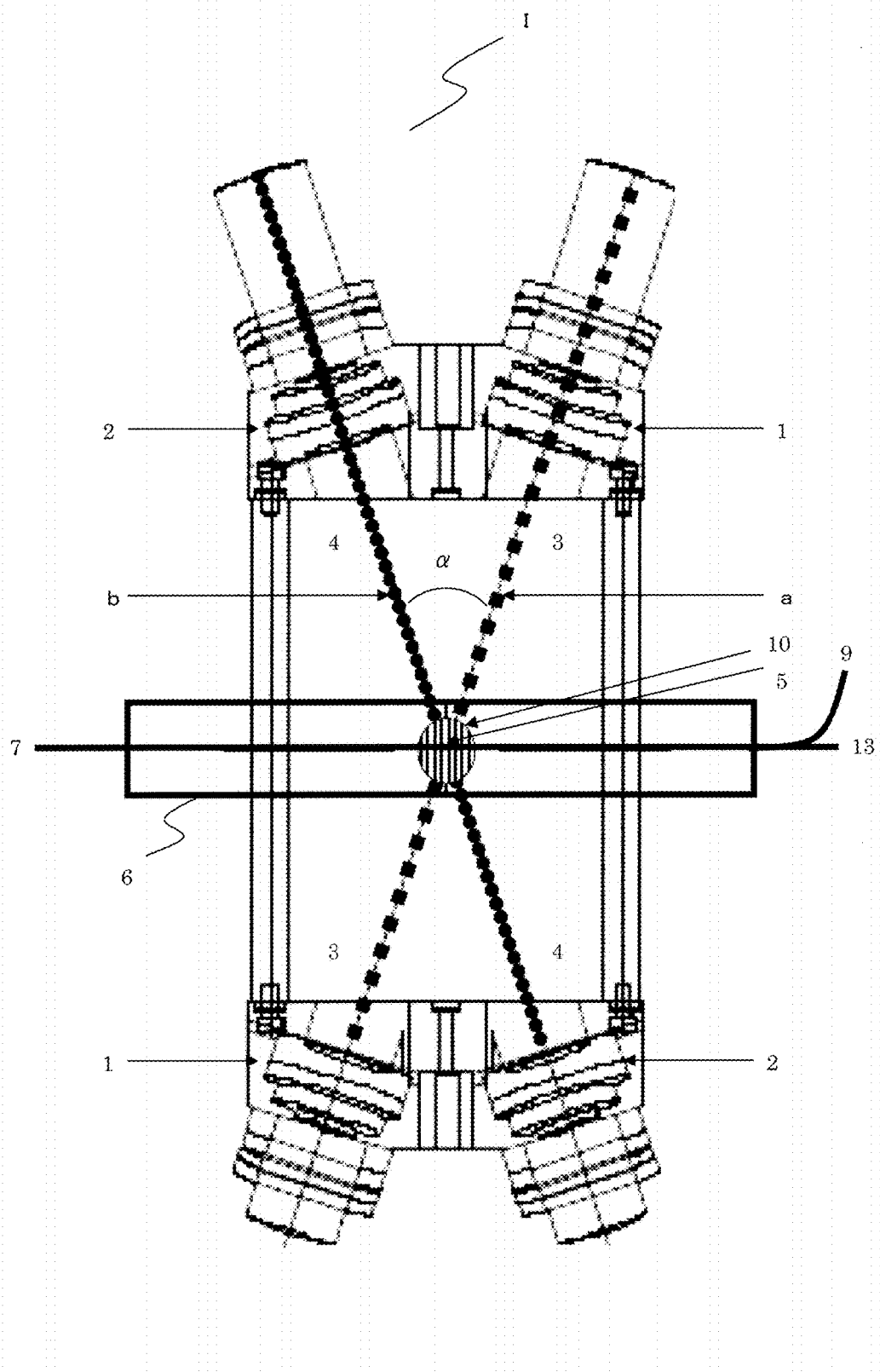
FIG. 9 is a schematic structural view illustrating the optical resonator that is capable of preparing X-ray in accordance with laser interference fringes.

FIG. 9 shows the optical resonator (I) according to claim 7, comprising: the resonant mirrors (1, 1, 2, 2); the laser paths (3, 4) to circulate two or more polarization lasers (a, b); the intersection (5) to cross the laser paths (3, 4); the electron feed port (6) inserted in the intersection (5); wherein, laser interference fringes (10) are formed in the intersection (5) by laser interference of two or more polarization lasers (a, b) circulating in the laser paths (3, 4), the formed laser interference fringes (10) are irradiated with electron beam (7) introduced from the electron feed port (6), followed by generation of X-ray (8) in accordance with the interference fringes. Separation of the generated X-ray (8) and remaining electron beam (9) is performed by bending electron beam orbital using a magnet. Stripe spacings of the above interference fringes can be controlled by changing an angle (α) between the resonant mirrors (1, 2), that is, a cross angle of overlapped polarized laser beams. The angle (α) is variable in the range from 0 degree to 180 degrees, usually 20 degrees or less, preferably 10 degrees or less. Control of the angle (α) is usually performed using a piezoelectric device used for controlling optical resonator length. An angle (β) between the electron beam feed port (7) penetrating the intersection (5) and two polarization laser paths (3, 4) is variable in the range from 0 degree to 180 degrees, is preferably set at 90 degrees, usually set at 90 degrees. As described above, it is preferable for generation of X-ray beams to orthogonalize the traveling direction of electron beam and wavefront of the interference fringes. When the β-angle is 90 degrees, the above two are orthogonal. Therefore, the β-angle is preferably 90 degrees. Although an optical resonator including a pair of resonant mirrors can be used as the optical resonator, the optical resonator including two or more pairs of resonant mirrors (1, 1, 2, 2) is preferable as the optical resonator.

Figure 10:
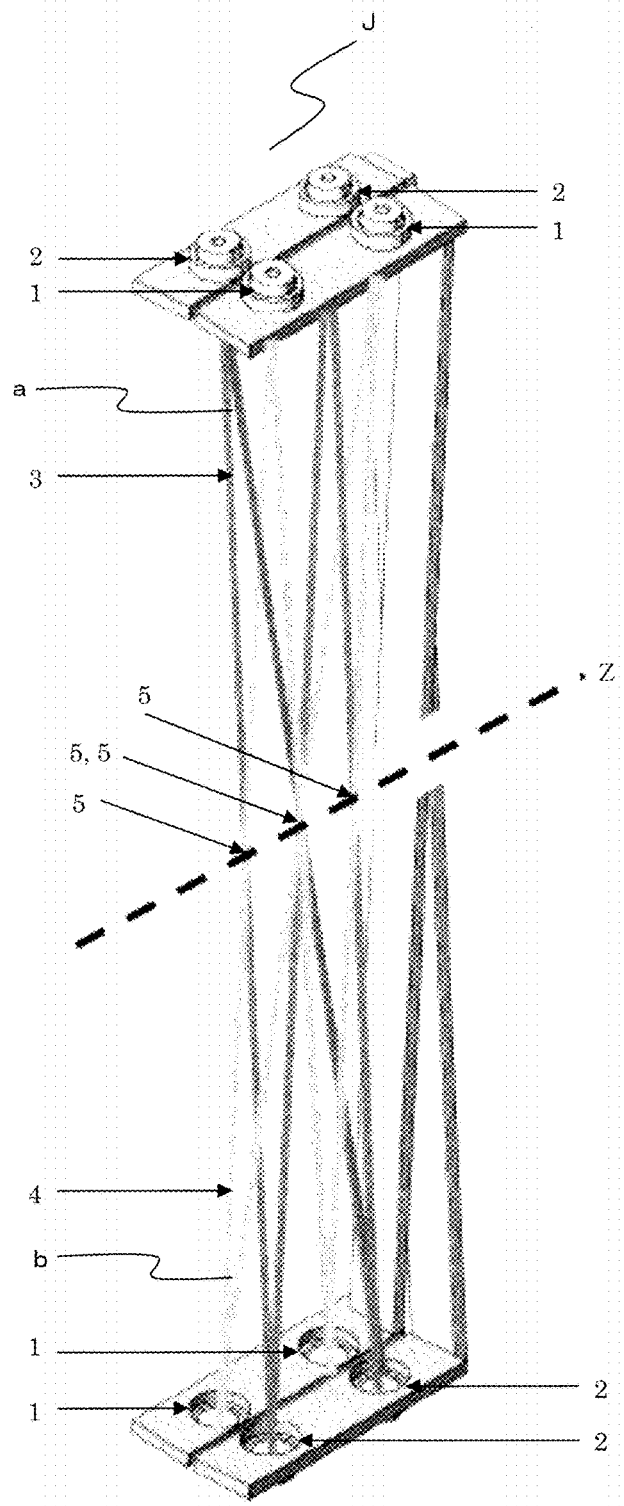
FIG. 10 is a schematic structural view illustrating the 3D-8-mirror optical resonator that is capable of preparing laser interference fringes.

FIG. 10 shows the 3-D-8-mirror optical resonator (J) according to any one of claims 2, 5 and 9, comprising: the 3D-8-mirror optical resonator (F). The 3-D-8-mirror optical resonator (F) comprises a 2-D-4-mirror optical resonator and its mirror-imaged optical resonator which are united and housed in a single frame. The 3-D-8-mirror optical resonator (F) includes eight mirrors (1, 1, 1, 1, 2, 2, 2, 2) to circulate two or more polarization lasers (a, b). Four intersections (5, 5, 5, 5) are lying on a straight line direction (Z) penetrating each intersection. The two or more polarization lasers are amplified between the resonant mirrors (1, 1, 2, 2). Laser interference fringes are generated at the intersection (5) by interference of polarization laser.

Figure 11:
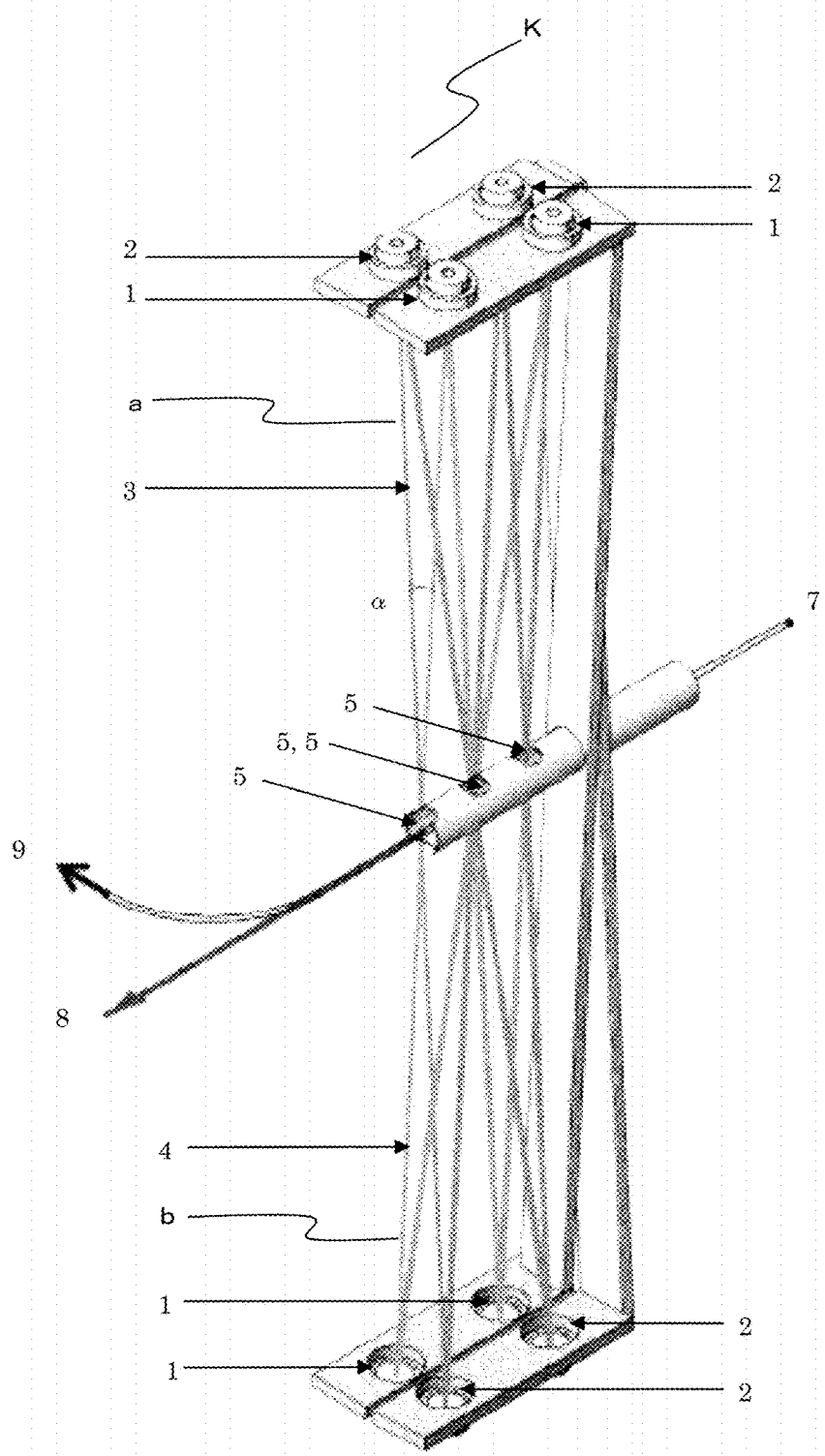
FIG. 11 is a schematic structural view illustrating the 3D-8-mirror optical resonator that is capable of preparing X-ray in accordance with laser interference fringes.

FIG. 11 shows the 3-D-8-mirror optical resonator (K) according to any one of claims 2, 3, 4, 5, 6 and 9, comprising: the 3D-8-mirror optical resonator (F); the electron feed port (6) inserted in the intersection (5) along the direction (Z) penetrating the intersection (5, 5, 5, 5) of the 3D-8-mirror optical resonator (F). The 3-D-8-mirror optical resonator (F) comprises a 2-D-4-mirror optical resonator and its mirror-imaged optical resonator which are united and housed in a single frame. The 2-D-8-mirror optical resonator (K) includes eight mirrors (1, 1, 1, 1, 2, 2, 2, 2) to circulate two or more polarization lasers (a, b). Four intersections (5, 5, 5, 5) are lying on a straight line direction penetrating each intersection. The two or more polarization lasers are amplified between the resonant mirrors (1, 1, 2, 2). Laser interference fringes are generated at the intersection (5) by interference of polarization laser. The interference fringes are irradiated with electron beam (7), followed by generation of X-ray (8) in accordance with the interference fringes. Separation of the generated X-ray (8) and remaining electron beam (9) is performed by bending electron beam orbital using a magnet.

When introducing two or more polarization lasers (a, b) including linear polarization laser into the optical resonator (K), the horizontal component of each polarization laser interferes with each other at the intersection (5) and interference fringes are formed at the intersection (5), therefore, the optical resonator (K) satisfies the 1$^{st}$ requirement. The interference fringes being formed on filling the 1$^{st}$ requirement are irradiated with electron beam (8) introduced from the electron beam feed port (7) so as to orthogonalize the traveling direction of the electron beam (8) and wavefront of interference fringes, which satisfies the 2$^{nd}$ requirement. The optical resonator (J) including the electron beam feed port (7) inserted in the intersection (5) along the direction (Z) to penetrate the intersection (5), which makes the radiation with electron beam (8) to the interference fringes being formed at the interference (5) possible and which makes the orthogonalization of the traveling direction of electron beam and wavefront of interference fringes possible, satisfies the 2$^{nd}$ requirement. Accordingly, the present optical resonator satisfying the 1$^{st}$ and 2$^{nd}$ requirements is capable of generating coherent X-ray.

Figure 12:
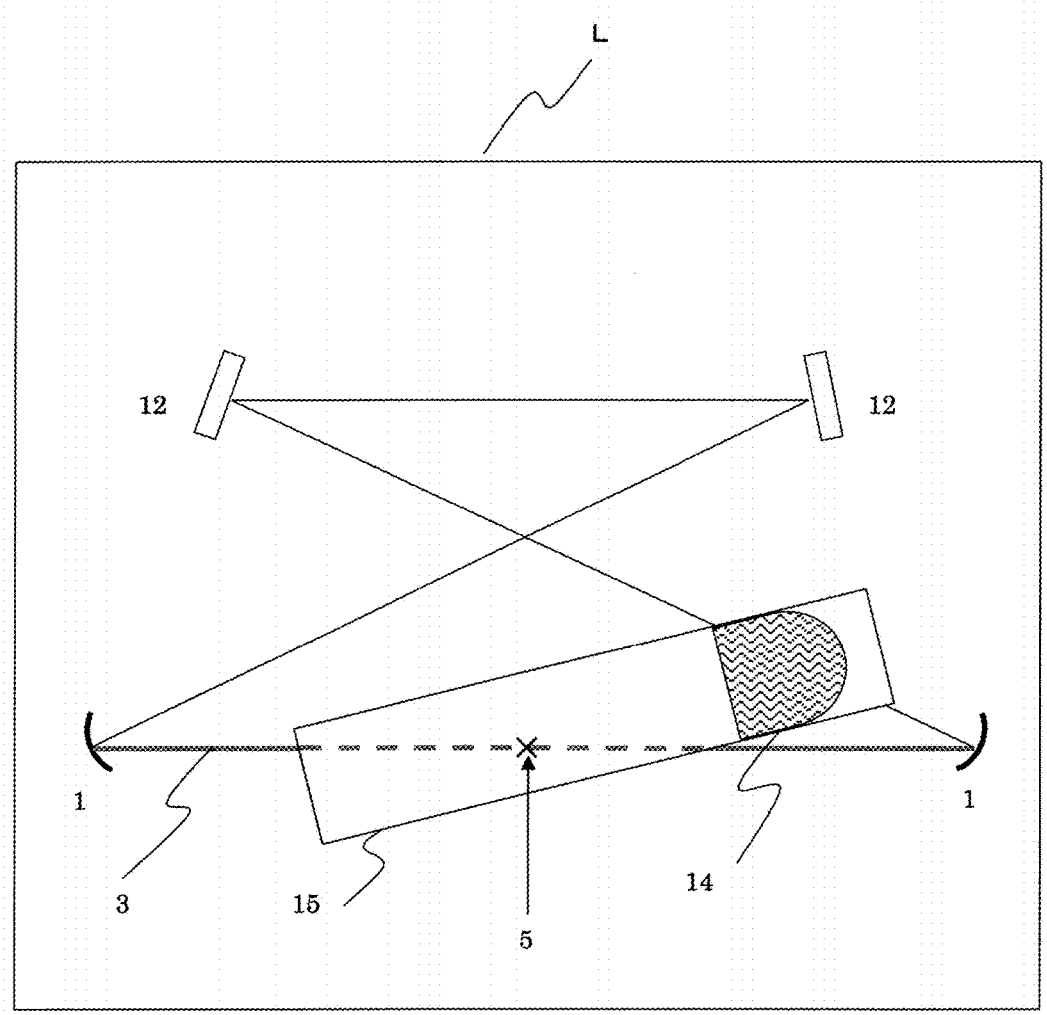
FIG. 12 is a schematic structural view illustrating the optical resonator equipping an electron feed port that includes an X-ray condenser lens and pinhole and is inserted in the laser path.

FIG. 12 shows the optical resonator (L) according to claim 6. The optical resonator (L) is characterized by comprising: resonant mirrors (1, 1); laser path (3) between the resonant mirrors (1, 1); electron beam feed port (15) housing an optical element with an X-ray condenser lens and pinhole (14) which is inserted in the laser path (3) between the resonant mirrors (1,1); wherein, laser beam in the laser path (3) are irradiated with electron beam introduced by the electron beam feed port (15) at the intersection (5), thereby X-ray is generated, the generated X-ray is transformed into coherent X-ray through the optical element (14). The mirrors (12, 12) are reflecting mirrors. The present optical resonator (L) is usually placed under vacuum to protect the strength of laser, electron beam and X-ray from environmental disturbance due to microparticles and supernatant in the optical path. An angle between the electron beam feed port (7) and laser path (3) is preferably set in the range from 0 to 20 degrees. The optical element with an X-ray condenser lens and pinhole (14) is the one with an X-ray condenser lens to condense X-ray and pinhole to give coherence characteristics to the condensed X-ray. By using the optical element (14), it is possible to reduce a decrease in the X-ray strength generated at the intersection (5) and to apply coherence characteristic to the X-ray. Diameters of the X-ray condensed lens and pinhole (14) are properly determined. An X-ray poly-capillary lens is used as the X-ray condensed lens. The optical element (14) is distantly-positioned from the intersection (5) in the direction of electron beam travel. The position of the optical element (14) is properly determined.

Figure 13:
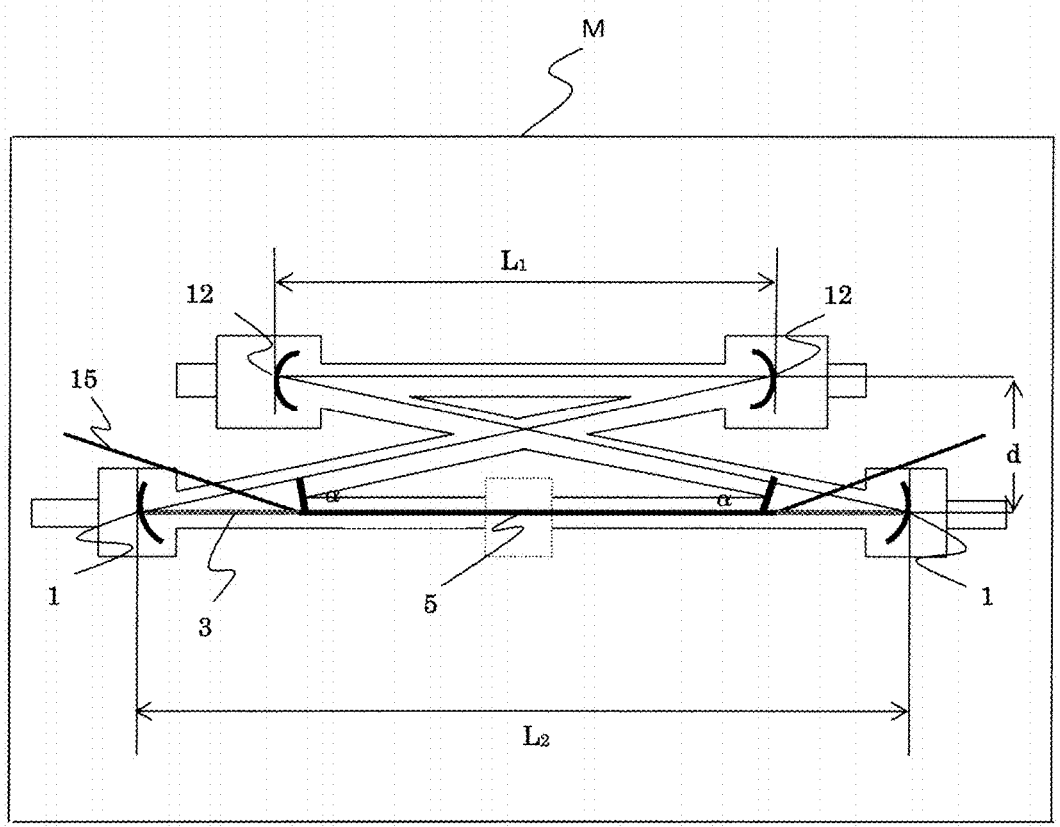
FIG. 13 is a schematic structural view illustrating the optical resonator that is capable of preparing coherent X-ray.

FIG. 13 shows the two-dimensional four-mirror (2-D-4-mirror) optical resonator (M) according to claim 7 or claim 10. The 2D-4-mirror optical resonator (M) has a structure in which a pair of reflecting mirrors (12, 12) and a pair of resonant mirrors (1, 1) are arranged in the plain based on envelop-calculation using a beam expander in the two-dimensional Gaussian beam optics. A cylindrical concave mirror is usually used as the reflecting mirror. The cylindrical concave mirror has a curvature of concave mirror in the vertical direction and no curvature in the horizontal direction. The cylindrical concave mirror is very effective to fair an ellipse laser beam profile into a circle laser beam profile. Therefore, the 2-D-4-mirror optical resonator (M) is different from the four mirror optical resonator disclosed in Patent Literature 7. The optical parameters such as a distance $L_1$ between the reflecting mirrors (12, 12), a distance (resonator length) $L_2$ between the resonant mirrors (1, 1), a resonator width d and an incident angle $\alpha$ and the like are optimized so as to minify a beam size (beam waist) $\omega_0$ of laser beam between the resonant mirrors (1, 1) by envelop-calculation using a beam expander in the Gaussian beam optics. At the result, it was found that the value of $\omega_0$ estimated from a relationship between $\omega_0$ of perpendicular and horizontal laser beams and S-parameters converges to a minimum of 5 μm of a perfect circle. Here, the S-parameter is a position of laser beam lying in the line between the concave mirrors. The obtained $\omega_0$ (=5 μm) is one-tenths the $\omega_0$ (=50 μm) for the conventional mode-lock laser oscillator. Accordingly, the 2-D-4-mirror optical resonator (M) enables the luminance to rise by 100 times compared to the conventional mode-lock oscillator. The perfect circle laser beams of 5 μm are amplified to a megawatt class of laser beam between the resonant mirrors (1, 1) and charged in the 2-D-4-mirror optical resonator (M). The electron beam feed port (15) housing an optical element with an X-ray condenser lens and pinhole is inserted in the laser path (3) between a pair of resonant mirrors (1, 1). High luminance of quasi-monochromatic X-rays are generated by collision of electron beams and a megawatt class of laser beam at the intersection (5), transformed into coherent X-ray through the optical element.

The 2-D-4-mirror optical resonator prepares perfectly collimated laser beam, which enables optical matching of incident, exiting and reflecting laser beams to be handled with very easy in comparison to the conventional optical resonator. Therefore, the 2-D-4-mirror optical resonator is preferable for the present invention.

The present optical resonator (M) is different from the 4-mirror optical resonator embedding spherical concave mirrors disclosed in the Patent Literature 7.

The Patent Literature 7 has disclosed the optical resonator to provide coherent addition of input laser light by controlling the optical system as four focal positions (25.1, 25.2, 25.3, 25.4) of four laser paths (3.1, 3.2, 3.3, 3.4) are aligned on a straight line. The Patent Literature 7 describes "The interference enables to adjust the direction of the effective wave vector and thus e. g. enables the electron beams to be aligned aside or between two resonator mirrors, e. g. 22 and 24, and steering the direction of the generated radiation." (1.4 on p. 27 to 1.8 on p. 27), "For generating hard X-ray radiation, a target is supplied by a target source device (not shown) at the focal position 25. In case of an electron bunch as target the electron beam of relativistic electrons is directed from an electron beam source (not shown) to the focal position 25 with a direction opposite to the propagation direction of the intra-resonator pulse 1 within the enhancement resonator. Further details of directing the electron beam to the focal position are described below with reference to FIG. 8." (1.32 on p. 34 to 1.6 on p. 35). That is, the above description is summarized as follows: electron beam are radiated to the direction allowing laser pulse to collide with electron beam, which is not at all dissimilar from the disclosure of the Patent Literatures 2 and 3.

However, the Patent Literature 7 does not describe or suggest anywhere the technological embodiments according to the present invention, that is, formation technology of laser interference fringes by circulating two or more polarization lasers in the optical resonator and generation technology of coherent X-ray by irradiation of the laser interference fringes with electron beam.

Figure 14:
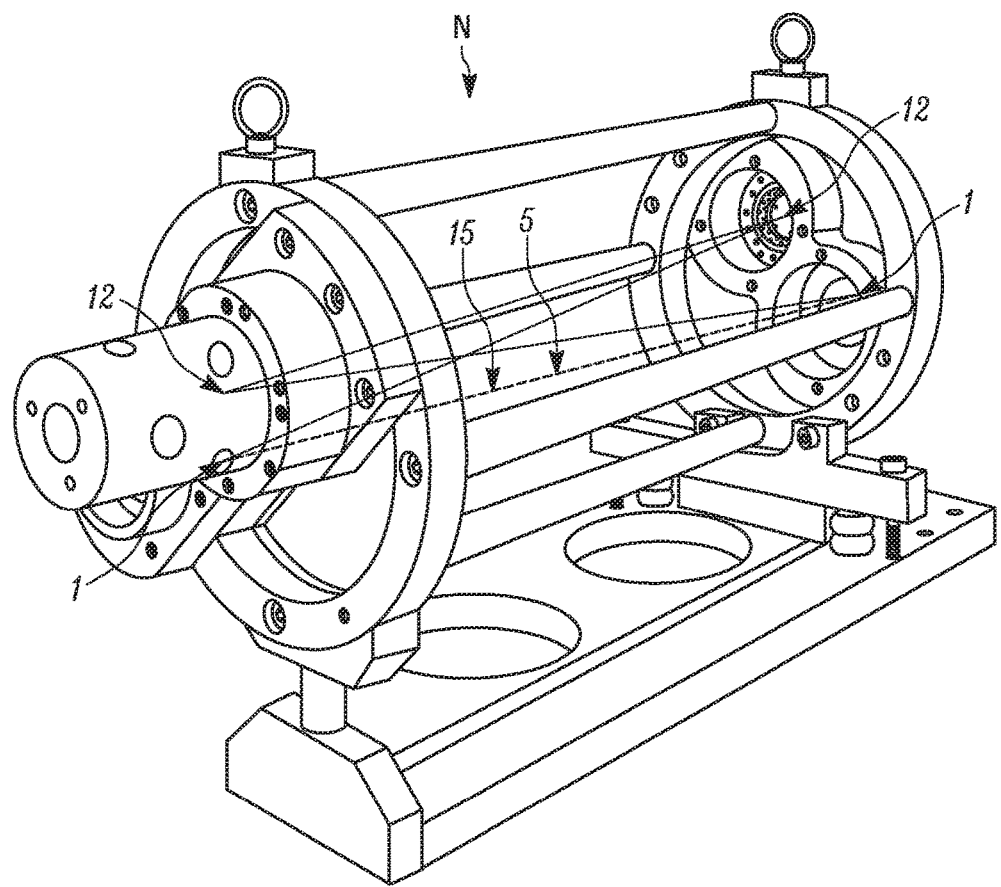
FIG. 14 is a schematic structural view illustrating the optical resonator that is capable of preparing coherent X-ray.

FIG. 14 shows the three-dimensional four-mirror (3-D-4-mirror) optical resonator (N) according to claim 7 or claim 10. The 3D-4-mirror optical resonator (N) includes a pair of resonant mirrors (1, 1) and a pair of reflecting mirrors (12, 12) which are three-dimensionally arranged (Patent Literature 9). Since two laser paths connecting the resonant mirrors (1, 1) and reflecting mirrors (12, 12) and are orthogonal to each other, incident- and reflected laser beams do not cause interference. The 3-D-4-mirror optical resonator (N) can generates circle laser beam of 15 μm in diameter. The laser beam is amplified to a megawatt class of laser beam through the resonant mirrors (1, 1) and accumulated in the optical resonator (N). The electron beam feed port (15) housing an optical element with an X-ray condenser lens and pinhole is inserted in the intersection (5). High luminance of quasi-monochromatic X-ray is generated by collision of electron beam and a megawatt class of circulating laser at the intersection (5), transformed into coherent X-ray through the optical element.

Another 2-D-4-mirror optical resonator in which a pair of reflecting mirrors being slightly bended using a mirror bender and a pair of resonant mirrors are arranged in the plane is able to fair elliptic laser beam between the resonant mirrors into circle beam. This is an application of photo-elastic effect. In this time, laser interference fringes are arising on the reflecting mirrors being slightly bended (Non-Patent Literature 3). Therefore, a usage of stressed resonant mirrors instead of unstressed resonant mirrors makes it possible to generate laser interference fringes in the laser path between the resonant mirrors. The laser interference fringes in the laser path between the resonant mirrors are irradiated with electron beam introduced by the electron feed port, followed by generation of coherent X-ray. The stress loaded to the resonant mirrors is preferably in the range of perfect elasticity of the resonant mirrors. The stressed resonant mirrors to generate laser interference fringes can be prepared by an application of the electro-optic effect such as the Pockels effect and Kerr effect besides the above application of the photo-elastic effect.

The present invention may equip a polarization control system to control polarization of laser in the optical resonator and resonance control system to control resonance of laser in the optical resonator. The control system disclosed in the Patent Literature 9 can be preferably used as the polarization control and resonance control system.

The present invention may equip an accelerator typed RF-gun.

INDUSTRIAL APPLICABILITY

The present invention relates to the optical resonator that makes it possible to prepare polarization laser, polarization X-ray and coherent X-ray. The present invention has industrial availability as relating to a method, apparatus and system to prepare polarization laser, polarization X-ray and coherent X-ray, in particular, has industrial availability for polarization X-ray analysis, coherent X-ray diffraction imaging, X-ray diagnostic treatment, R & D of new drugs, and the like. In addition, the present invention is useful for a variety of industrial usages such as medical instrument, material analyzer, structural analyzer, material processing, and the like.

What is claimed is:

1. An optical resonator comprising an optical system that includes:
   two or more independent laser paths extensive to propagate therealong two or more independent laser beams, separately and respectively;
   an intersection of at least some of the two or more independent laser paths at which at least some of the two or more independent laser beams intersect together; and
   windows provided at both ends of a respective straight segment of each independent laser path, the windows being arranged with optical components each designed to introduce in the optical system, exit from the optical system or reflect in the optical system one of the two or more independent laser beams.

2. The optical resonator according to claim 1, wherein the optical components include resonant mirrors adapted to transfer the two or more independent laser beams, respectively, into two or more independent polarized laser beams,
   the two or more independent laser paths include two or more independent laser paths extensive to propagate the two or more independent polarized laser beams between the resonant mirrors, and
   the intersection of the at least some of the two or more independent laser paths includes an intersection at which at least some of the two or more independent polarized laser beams intersect together.

3. The optical resonator according to claim 2, further comprising an electron beam feed port inserted in the intersection of the at least some of the two or more independent laser paths to irradiate an electron beam to the at least some of the two or more independent polarized laser beams at the intersection to thereby generate polarized X-ray at the intersection.

4. The optical resonator according to claim 2, wherein the polarized laser beam comprises a polarization component of polarized laser beam, and the electron beam feed port irradiates the electron beam to the polarization component at the intersection to generate polarized X-ray.

5. The optical resonator according to claim 3, wherein the polarized laser beam comprises a polarization component of polarized laser beam, and the electron beam feed port irradiates the electron beam to the polarization component at the intersection to generate polarized X-ray at the intersection.

6. The optical resonator according to claim 2, wherein the at least some of the two or more independent polarized laser beams interfere with each other at the intersection to form interference fringes at the intersection.

7. The optical resonator according to claim 6, further comprising an electron beam feed port inserted in the intersection of the at least some of the two or more independent laser paths to irradiate an electron beam to the interference fringes at the intersection to thereby generate X-ray.

8. An optical resonator comprising:
resonant mirrors;
a laser path extensive to propagate a laser beam therealong between the resonant mirrors;
an electron beam feed port configured to irradiate an electron beam to the laser beam propagating along the laser path to generate X-ray; and
an optical element inserted in the laser path, the optical element including an X-ray condenser lens and pinhole functional to transform into coherent X-ray the X-ray generated from irradiation of the electron beam to the laser beam.

9. An X-ray generating optical resonator, comprising:
a laser path extensive to propagate a laser beam therealong;
mirrors placed, respectively, at both ends of a straight segment of the laser path, wherein the laser beam propagates along the laser path between the mirrors, wherein the mirrors comprise resonant mirrors and reflecting mirrors, the reflecting mirrors being permanently bended without any mechanical actuator so as to generate laser interference fringes in the laser path from the laser beam incident on the reflecting mirrors; and
an electron beam feed port inserted in the laser path between the mirrors, the electron beam feed port being configured to irradiate an electron beam to the laser interference fringes generated in the laser path between the mirrors to thereby generate coherent X-ray.

10. The optical resonator according to claim 2, wherein the optical resonator comprises a 3D-8-mirror optical resonator.

11. The optical resonator according to claim 3, wherein the optical resonator comprises a 3D-8-mirror optical resonator.

12. The optical resonator according to claim 4, wherein the optical resonator comprises a 3D-8-mirror optical resonator.

13. The optical resonator according to claim 5, wherein the optical resonator comprises a 3D-8-mirror optical resonator.

14. The optical resonator according to claim 6, wherein the optical resonator comprises a 3D-8-mirror optical resonator.

15. The optical resonator according to claim 7, wherein the optical resonator comprises a 3D-8-mirror optical resonator.

16. The optical resonator according to claim 8, wherein the optical resonator comprises one of a 2D-4-mirror optical resonator and a 3D-4-mirror optical resonator.

* * * * *

UNITED STATES PATENT AND TRADEMARK OFFICE
CERTIFICATE OF CORRECTION

PATENT NO. : 9,832,851 B2
APPLICATION NO. : 15/102781
DATED : November 28, 2017
INVENTOR(S) : Junji Urakawa et al.

Page 1 of 1

It is certified that error appears in the above-identified patent and that said Letters Patent is hereby corrected as shown below:

On the Title Page

Left column, Item (73), replace "INTER-UNIVERSITY RESEARCH CORPORATION HIGH ENERGY ACCELERATOR RESEARCH ORGANIZATION" with --INTER-UNIVERSITY RESEARCH INSTITUTE CORPORATION HIGH ENERGY ACCELERATOR RESEARCH ORGANIZATION--.

Signed and Sealed this
Seventh Day of May, 2019

Andrei Iancu
*Director of the United States Patent and Trademark Office*